United States Patent [19]
Yoshigai

[11] Patent Number: 4,909,094
[45] Date of Patent: Mar. 20, 1990

[54] BRAKE LEVER DEVICE FOR BICYCLES
[75] Inventor: Kenichi Yoshigai, Osaka, Japan
[73] Assignee: Yoshigai Kikai Kinzoku Kabushiki Kaisha, Osaka, Japan
[21] Appl. No.: 243,778
[22] PCT Filed: Dec. 15, 1987
[86] PCT No.: PCT/JP87/00984
    § 371 Date: Aug. 17, 1988
    § 102(e) Date: Aug. 17, 1988
[87] PCT Pub. No.: WO88/05005
    PCT Pub. Date: Jul. 14, 1988
[30] Foreign Application Priority Data
    Dec. 24, 1986 [JP] Japan .................. 61-310557
    May 23, 1987 [JP] Japan .................. 62-126737
[51] Int. Cl.⁴ .................. B62K 23/06; B62L 3/02; G05G 5/18
[52] U.S. Cl. .................. 74/489; 74/502.2; 74/502.4; 74/502.6; 74/526
[58] Field of Search .................. 74/488, 489, 502.2, 74/502.4, 502.6, 526

[56] References Cited
U.S. PATENT DOCUMENTS
3,948,361 4/1976 Carlson .................. 74/489 X
4,066,154 1/1978 Ross .................. 74/501.5 R X
4,088,040 5/1978 Ross-Hyring .................. 74/489 X

FOREIGN PATENT DOCUMENTS
336886  1/1904  France .................. 74/489
589293  2/1925  France .................. 74/502.2
604885  5/1960  Italy .................. 74/489
51-35984 10/1976 Japan .
54-64339  5/1979 Japan .
55-50061 11/1980 Japan .
56-14424  4/1981 Japan .
56-131283 10/1981 Japan .
60-3383   7/1982 Japan .

Primary Examiner—Allan D. Herrmann
Attorney, Agent, or Firm—Sixbey, Friedman, Leedom & Ferguson

[57] ABSTRACT

The invention relates to a brake lever device for use on the handlebar of a bicycle. With conventional brake lever devices, the center of rotation of the brake lever is a large distance away from the axis of the handlebar, radially outwardly of the bar, and the Bowden cable connected to the lever is correspondingly projected and is very likely to be caught by an obstacle, while the arrangement involves waste of materials. Accordingly, to position the center (O) of rotation of a brake lever (43) close to the central axis of the handlebar (1), a pivot (4) for the brake lever (43) is positioned perpendicular to the central axis (C) of a handlebar inserting bore (5) of a brakcet (2).

5 Claims, 5 Drawing Sheets

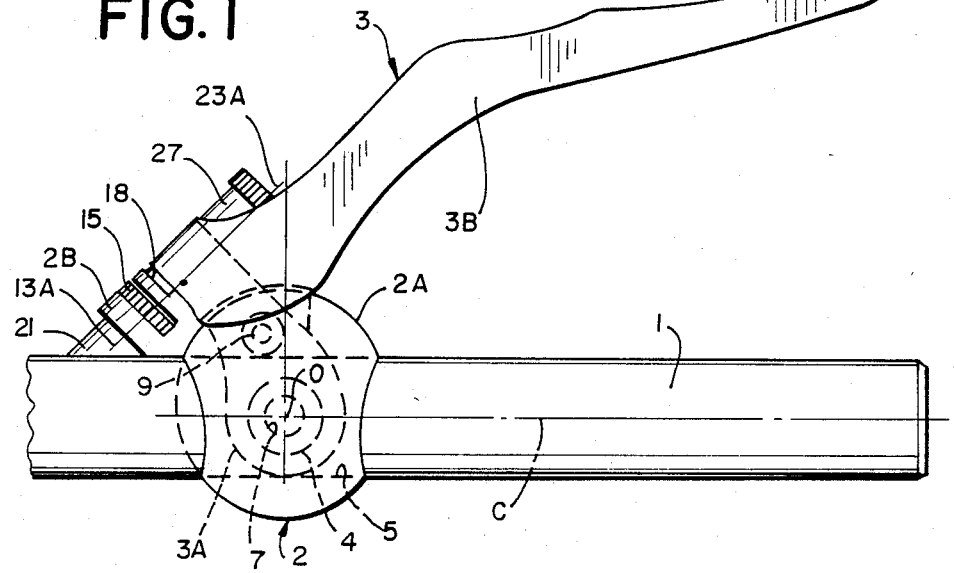
FIG. 1
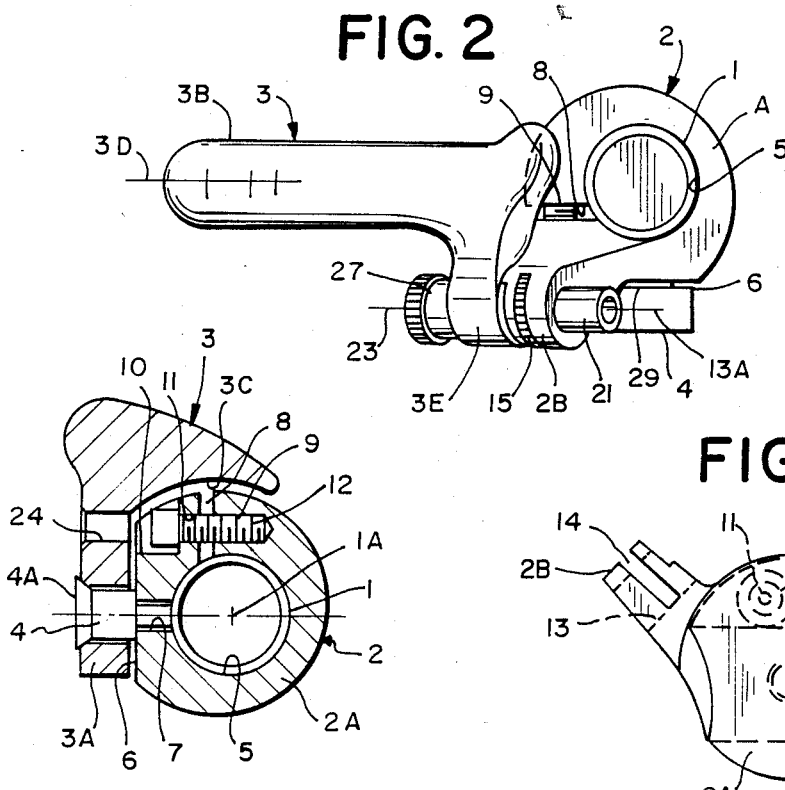
FIG. 2
FIG. 4
FIG. 5

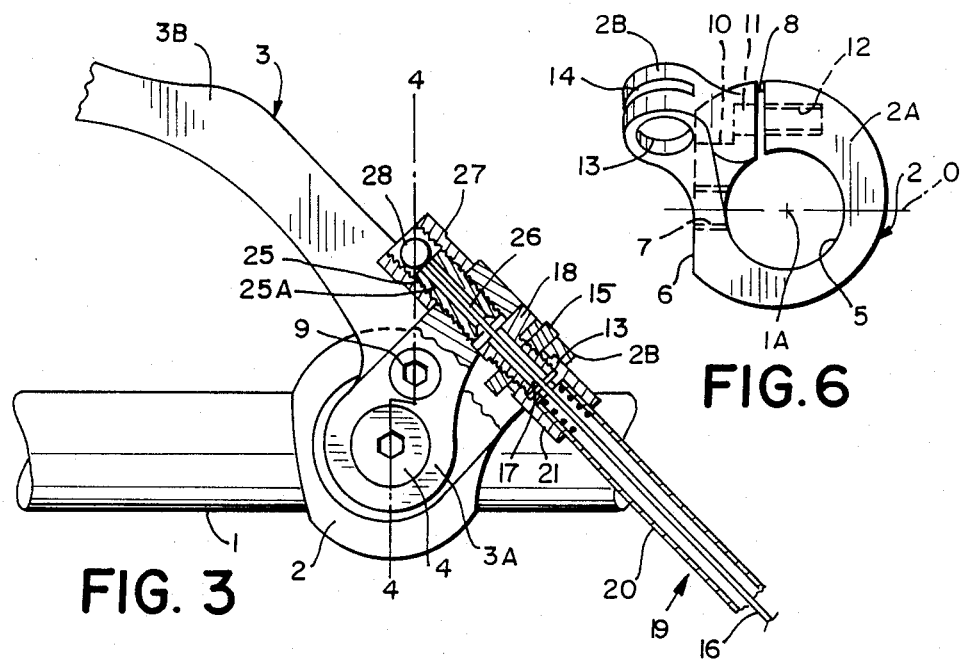
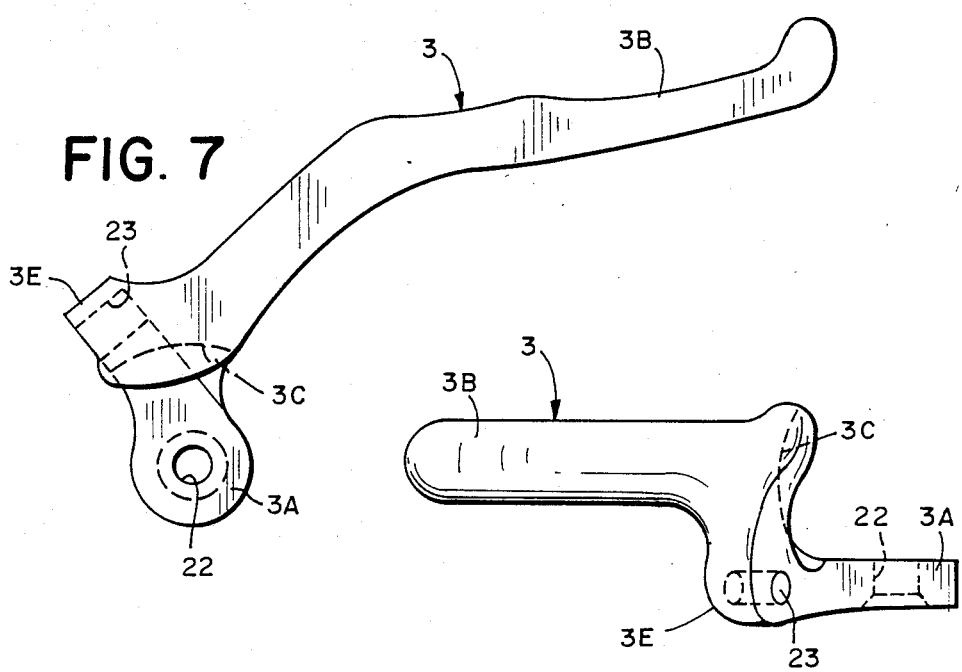

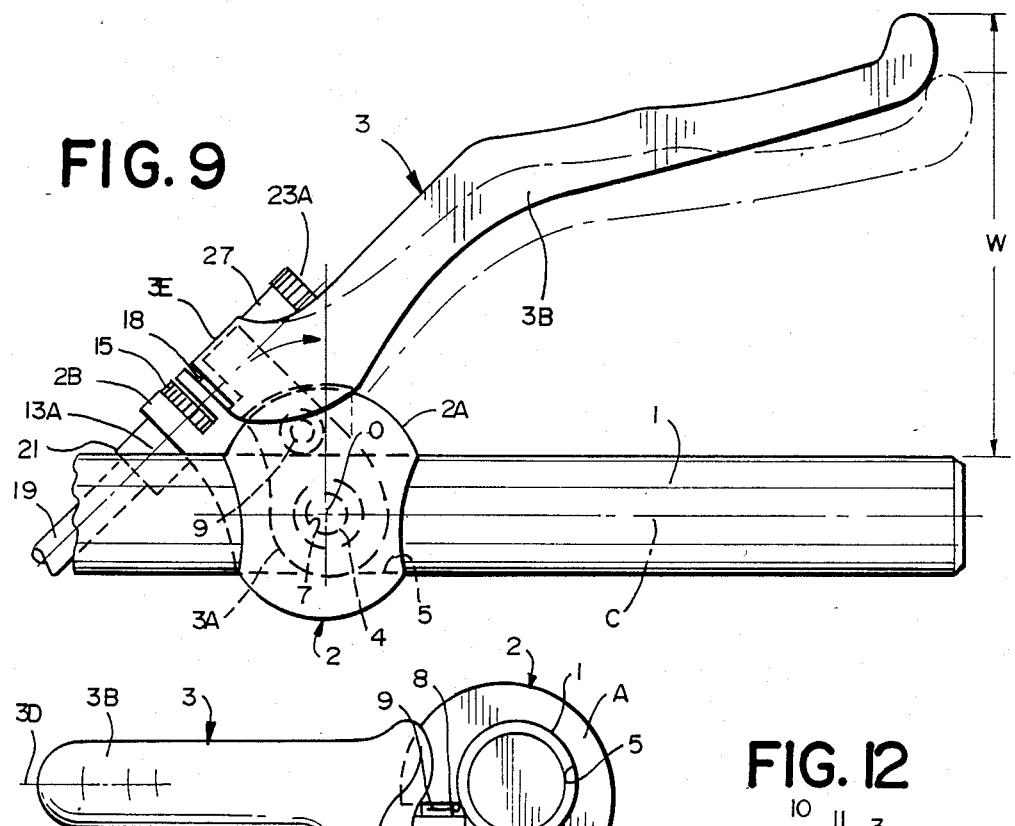
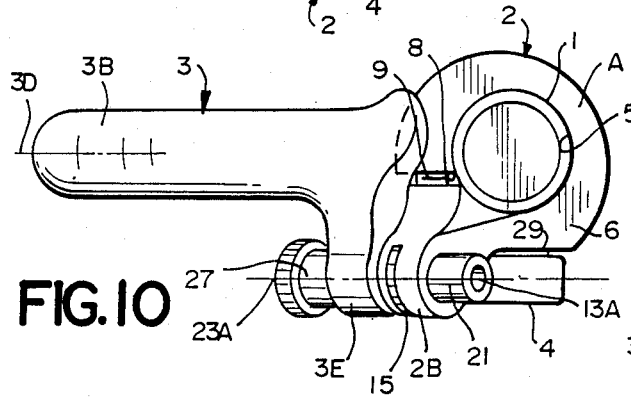
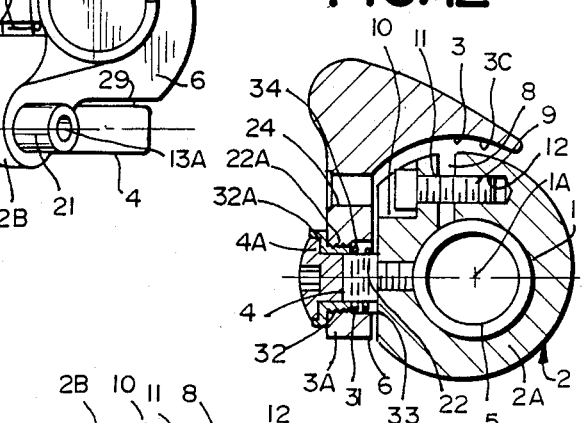
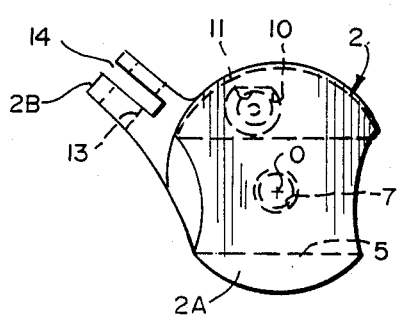
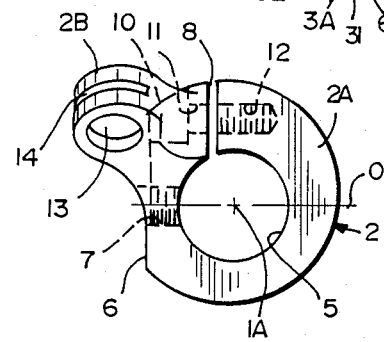

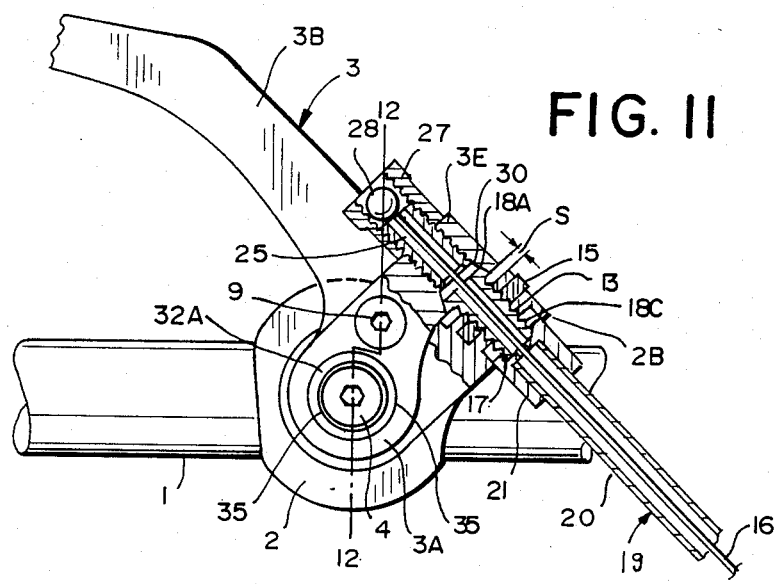
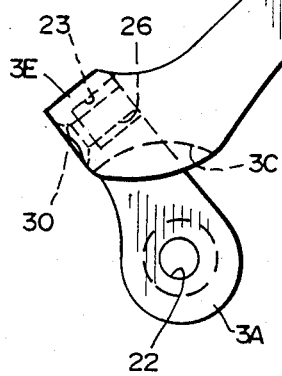
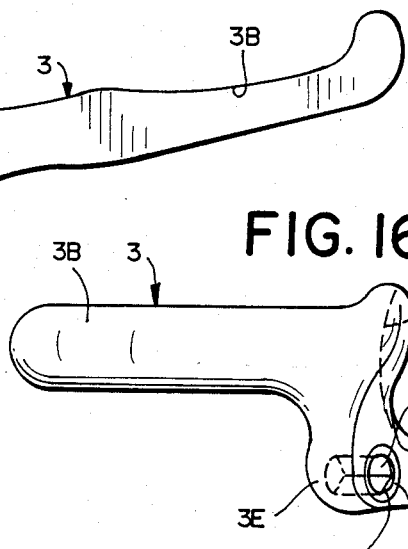
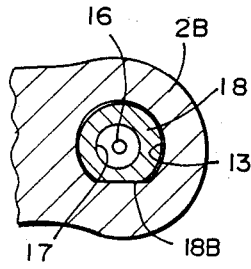
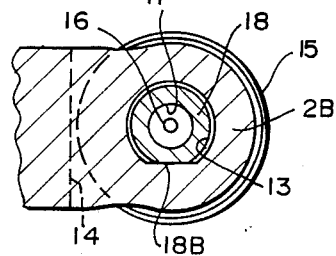

BRAKE LEVER DEVICE FOR BICYCLES

TECHNICAL FIELD

The present invention relates to a brake lever device for use on the handlebar of a bicycle.

BACKGROUND ART

FIG. 21 shows a conventional brake lever device, which comprises a bracket 42 mounted on a handlebar 41, and a brake lever 43 mounted on the bracket and pivotally movable about an axis O. The bracket 42 has a portion 44 for holding the outer wire of a Bowden cable 49, and the brake lever 43 is provided with a portion 45 for holding the inner wire of the cable (see Examined Japanese Utility Model Publication SHO 60-3383).

With the above conventional brake lever device, the center O of movement of the brake lever 43 is at a large distance S from the central axis C of the handlebar 41 radially outwardly of the bar as illustrated. Accordingly, the brake lever device is projected radially outward from the handlebar 41 by an amount corresponding to the distance. The portions 44, 45 for holding the Bowden cable 49 are therefore projected from the handlebar 41 radially outward, so that the Bowden cable 49 is correspondingly likely to become engaged with an obstacle or the like while the bicycle is driven, hence hazardous. Moreover, the device in its entirety undesirably has a large size involving waste of materials.

Further if the distance L between the brake lever 43 and the handlebar 41 is definite, the brake becomes difficult to operate depending on the size of the rider's hand. Accordingly, an adjusting bolt 46 screwed through the bracket 42 in bearing contact with the brake lever 43 is turned and thereby moved axially thereof to alter the position of contact of the bolt 46 with the brake lever 43 and vary the opening distance L for the brake lever 43 for adjustment (see Examined Japanese Utility Model Publication SHO 56-14424).

With the conventional brake lever device described, the adjusting bolt 46 is positioned in a narrow space between the Bowden cable 49 and the handlebar 41 and is therefore difficult to move for adjustment. The arrangement is further unsightly.

The spacing between the wheel rim of the bicycle and the brake shoes, which must be maintained at the proper value, varies if the brake shoe wears or the opening distance L of the brake lever 43 is altered. In such a case, there arises a need to adjust the length of the inner wire, whereas the conventional device is not provided with means for readily adjusting the length of the inner wire, which therefore requires a cumbersome adjusting procedure.

The object of the present invention is to overcome the foregoing problems.

DISCLOSURE OF THE INVENTION

To solve the problems of the prior art, the present invention provides a brake lever device for bicycles which includes a bracket 2 mountable on a handlebar 1 and a brake lever 3 pivotally movably mounted on the bracket, the bracket 2 having a portion for holding the outer wire of a Bowden cable 19, the brake lever 3 having a portion for holding the inner wire of the cable. First, the device is characterized in that the bracket 2 has a bore 5 for removably inserting the handlebar 1 therethrough, a pivot 4 being positioned substantially perpendicular to the central axis C of the inserting bore 5, the brake lever 3 being mounted on the pivot 4 and movable about the axis thereof.

In addition to the first feature, the device has the second feature that the outer wire holding portion 2B is provided with a screw tube 18 movable axially thereof by turning an adjusting nut 15 screwed thereon for adjusting the opening width of the brake lever, the adjusting screw tube 18 having the inner wire 16 inserted therethrough, the adjusting screw tube 18 being in contact at its one end with the end of the inner wire holding portion 3E opposed to the outer wire holding portion 2B.

In addition to the first feature, the device has the third feature that the inner wire holding portion 3E is provided with an inner wire adjusting screw 25 movable axially thereof by turning an adjusting nut 27 screwed thereon, the adjusting screw 25 having the inner wire 16 inserted therethrough and engaging the inserted end thereof.

The fourth feature of the device is the combination of the first feature with the second and third features.

In addition to the first and second features, the device has the fifth feature that the other end of the adjusting screw tube 18 is joined to an outer wire holding tube 21 so as to be movable therewith in the axial direction.

In addition to the fourth feature, the device has the sixth feature that the other end of the adjusting screw tube 18 is joined to an outer wire holding tube 21 so as to be movable therewith in the axial direction.

According to the first feature of the invention, the center of pivotal movement of the brake lever 43 is not a large distance radially outwardly away from the central axis of the handlebar 1, so that the portions for holding the Bowden cable 19 can be positioned close to the handlebar 1 to the greatest possible extent. This diminishes the likelihood that the Bowden cable 19 will be caught by an obstacle or the like, further compacting the device in its entirety to eliminate the waste of materials.

In addition to the advantage afforded by the first feature, the second feature assures that the opening width of the brake lever 43 is adjustable by axially moving the adjusting screw tube 18 along the cable 19, on the outer wire holding portion 2B of the bracket 2. Unlike the conventional arrangement, therefore, the adjusting nut 15 for axially moving the screw tube 18 need not be positioned in the narrow space between the Bowden cable 19 and the handlebar 1, hence facilitated adjustment. The screw tube 18 which is precluded from projecting beyond the bracket 2 ensures a favorable appearance.

According to the third feature in combination with the advantage afforded by the first feature, the adjusting nut 27, when turned, moves the adjusting screw 27 axially thereof along the inner wire 16 to adjust the length of the inner wire 16 which is engaged with the screw 25, whereby the spacing between the tire rim and the brake shoes is adjustable efficiently.

According to the fourth feature, the advantages of the second and third features are available in combination.

The fifth feature affords the following advantage in addition to the advantage given by the second feature. When the opening width of the brake lever 3 is altered, the spacing between the tire rim and the brake shoes also varies. According to the fourth feature described, the spacing between the tire rim and the brake shoe must be adjusted independently of the adjustment of the opening width of the brake lever 3, whereas if the outer wire holding tube 21 is made movable with the adjusting screw tube 18, the alteration of the opening width of the brake lever 3 produces no change in the relative relation between the outer wire and the inner wire, consequently resulting in no variation in the spacing between the tire rim and the brake shoes and eliminating the need to adjust the spacing. Thus the lever opening width is adjustable efficiently.

The sixth feature provides in combination the advantages afforded by the third and fifth features. More specifically, the opening width of the brake lever is adjustable easily with a higher efficiency. If the brake shoes wear away, the spacing between the rim and the shoes is adjustable efficiently.

BRIEF DESCRIPTION OF THE DRAWINGS

FIGS. 1 to 8 show a first embodiment of the present invention. FIG. 1 is a plan view; FIG. 2 is a front view; FIG. 3 is a bottom view partly broken away; FIG. 4 is a view in section taken along the line 4—4 in FIG. 3; FIG. 5 is a plan view of a bracket; FIG. 6 is a front view of the bracket; FIG. 7 is a plan view of a brake lever; and FIG. 8 is a front view of the brake lever.

FIGS. 9 to 20 show a second embodiment of the invention. FIG. 9 is a plan view; FIG. 10 is a front view; FIG. 11 is a bottom view partly broken away; FIG. 12 is a view in section taken along the line 12—12 in FIG. 11; FIG. 13 is a plan view of a bracket; FIG. 14 is a front view of the bracket; FIG. 15 is a plan view of a brake lever; FIG. 16 is a front view of the brake lever; FIG. 17 is a fragmentary enlarged sectional view of FIG. 11; FIG. 18 is a view in section taken along the line 18—18 in FIG. 17; FIG. 19 is a sectional view taken along the line 19—19 in FIG. 17; and FIG. 20 is a view in section taken along the line 20 in FIG. 17.

BEST MODE OF CARRYING OUT THE INVENTION

Figure 17:
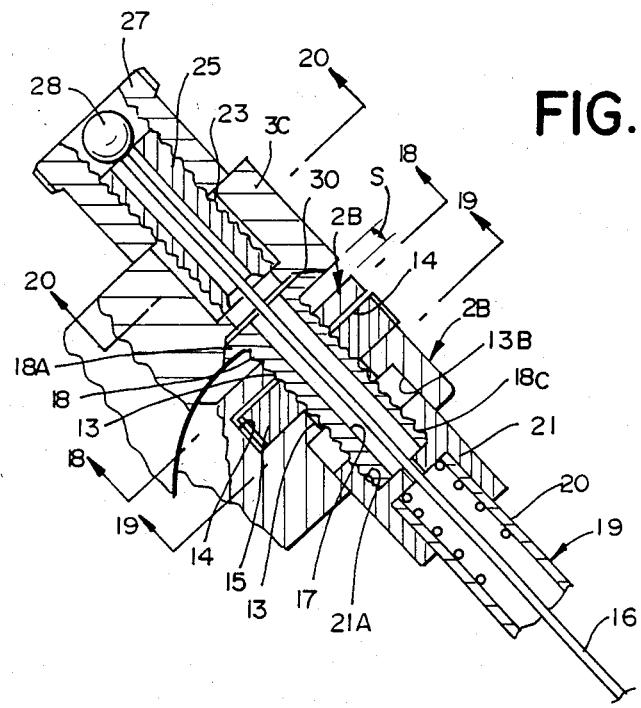
Figure 20:
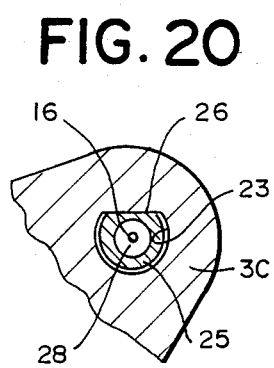
Figure 21:
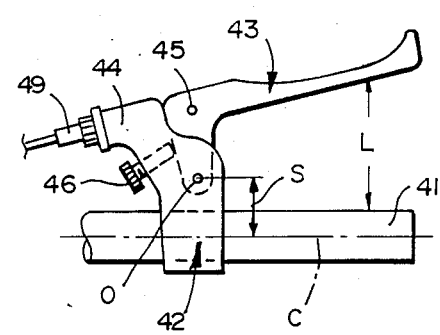
FIG. 21 is a schematic plan view of a conventional device.

A first mode of practicing the present invention will be described with reference to FIGS. 1 to 8.

Referring to these drawings, indicated at 1 is the handlebar of a bicycle, at 2 a bracket mounted on the handlebar 1, and at 3 a brake lever rotatably mounted on a pivot 4.

As seen in FIGS. 5 and 6, the bracket 2 has a generally spherical handlebar gripping portion 2A formed with a bore 5 for inserting the handlebar therethrough, and a portion 2B for holding the outer wire of a Bowden cable, the holding portion extending from the gripping portion 2A radially outwardly of the handlebar 1 and slanting with respect to the axis of the handlebar. The gripping portion 2A has a planar face 6 in parallel to the central axis C of the handlebar inserting bore. A threaded hole 7 for the pivot 4 is formed in the planar portion 6. The axis O of the pivot 4 intersects the central axis C of the bore at right angles therewith. A dividing groove 8 parallel to the planar face 6 is formed in the gripping portion 2A in communication with the inserting bore 5. The gripping portion is formed with a head cavity 10, a shank hole 11 and a threaded hole 12 for a fastening bolt 9 across the groove 8 at right angles therewith. Accordingly, the fastening bolt 9 is precluded from projecting beyond the outer surface of the gripping portion 2A of the bracket 2.

To provide the fastening bolt 9, the bore 5 for inserting the handlebar 1 is made eccentric with respect to the center of the spherical gripping portion 2A for a reduction in weight and from the viewpoint of design, but the eccentricity is not limitative.

The outer wire holding portion 2B is formed with a bore 13 having inserted therethrough a screw tube for adjusting the opening width of the brake lever, the bore 13 being inclined with respect to the central axis C of the handlebar inserting bore. A cutout 14 having an adjusting nut 15 fitted therein is formed in the portion 2B at right angles with the insertion bore 13. The adjusting nut 15 is screwed on the adjusting screw tube 18 which is hollow and has a bore 17 for inserting an inner wire 16 therethrough. An outer wire holding tube 21 for attaching thereto one end of the outer wire 20 of the Bowden cable 19 is fitted in one open end of the screw tube insertion bore 13.

With reference to FIGS. 7 and 8, the brake lever 3 includes a mount portion 3A and a grip portion 3B which are generally in an L-shaped arrangement. The mount portion 3A has a hole 22 for inserting the pivot 4 therethrough.

The corner of the L-shaped lever serves as an inner wire holding portion 3E and has a bore 23 extending therethrough for an inner wire adjusting screw. The lever is formed at its base end with a concave face 3C along the bracket 2 and having a slightly larger radius than the spherical surface of the bracket 2 so that the brake lever 3 will not interfere with the bracket 2 even when moved about the pivot 4.

The horizontal central axis 3D of the grip portion 3B of the brake lever 3 is positioned in the same plane as the central axis C of the handlebar inserting bore. The horizontal axis 23A of the inner wire adjusting screw inserting bore 23 is positioned in the same plane as the horizontal axis 13A of the screw tube insertion bore 13 of the bracket 2. The lever central axis 3D is parallel to the horizontal axes 13A and 23A.

The grip portion of the brake lever 3 has a thickness gradually decreasing toward its outer end and is smoothly curved by eliminating corners so as not to feel ragged when touched by hand. The head 4A of the pivot 4 is almost unprojected beyond the outer side surface of the mount portion 3A of the brake lever 3.

Indicated at 24 is a hole for inserting therethrough a tool for fastening the bolt 9.

The inner wire adjusting screw, which is tubular and indicated at 25, has an outer peripheral portion cut out in parallel to the axis to provide a planar portion 25A. When the adjusting screw 25 is inserted in the bore 23, a setscrew screwed in the lever at right angles with the bore 23 bears against the screw 25, permitting the screw 25 to move axially thereof without rotating. The adjusting screw 25 is projected toward the grip portion 3B of the brake lever 3, and an inner wire adjusting nut 27 is screwed on the projected portion. The inner wire 16 is inserted in the nut 27 and has an end member 28 which is retained within the nut 27. Indicated at 29 is a wave washer.

The base end face of the brake lever 3 having the bore 23 is in contact with the head face 18A of the adjusting screw tube 18. The adjusting nut 15, when rotated, moves the screw tube 18 axially thereof to adjust the distance between the outer wire holding portion 2B of the bracket 2 and the brake lever 3, i.e. the opening width of the brake lever 3.

Further the inner wire adjusting nut 27, when rotated, moves the adjusting screw 25 axially thereof, whereby the length of the inner wire 16 is adjustable optimally.

The Bowden cable outer wire holding portion 2B of the bracket 2 and the portion of the brake lever 3 around the inserting bore 23 which serves to hold the inner wire of the cable are arranged on a circumference centered about the pivot 4.

According to the foregoing embodiment, the center O of pivotal movement of the brake lever 3 is close to the central axis of the handlebar inserting bore 5, i.e. to the central axis C of the handlebar 1, so that the Bowden cable holding portions are positioned close to the handlebar to the greatest possible extent. This diminishes the likelihood that the cable 19 will be caught by an obstacle or the like.

The head of the fastening bolt 9 for the bracket 2 is positioned in the cavity 10 in the lower side of the bracket without projecting, while the head 4A of the pivot 4 is almost unprojected from the brake lever. The brake lever therefore has a neat appearance, feels good and is easy to grasp.

Ideally, the axis O of rotation of the brake lever 3 should be positioned on the central axis C of the handlebar inserting bore 5, but can be positioned in the vicinity of the axis C depending on the design.

According to the present embodiment the Bowden cable holding portions of the bracket 2 and the brake lever 3 can be positioned closer to the rotation axis 0 to further diminish the amount of projection thereof by suitably determining the angle between the central axes 13A, 23A of the bores 13, 23 and the distance of the brake lever 3 from the rotation axis O.

The position where the fastening bolt 9 is attached to the bracket 2 may be so selected that the brake lever 3 will not become an obstacle when the bolt is fastened.

A second mode of practicing the invention will be described with reference to FIGS. 9 to 20.

Referring to these drawings, indicated at 1 is the handlebar of a bicycle, at 2 a bracket mounted on the handlebar 1, and at 3 a brake lever rotatably mounted on a pivot 4.

As seen in FIG. 13 and FIG. 14, the bracket 2 has a generally spherical handlebar gripping portion 2A formed with a bore 5 for inserting the handlebar therethrough, and a portion 2B for holding an outer wire, the holding portion extending from the gripping portion 2A radially outwardly of the handlebar 1. The gripping portion 2A has a face 6 which is planar and in parallel to the central axis C of the handlebar inserting bore. A threaded hole 7 is formed in the planar portion 6 for attaching the pivot 4. The axis O of the pivot 4 intersects the central axis C of the bore at right angles therewith. A dividing groove 8 parallel to the planar face 6 is formed in the gripping portion 2A in communication with the inserting bore 5. The gripping portion is formed with a head cavity 10, a shank hole 11 and a threaded hole 12 for a fastening bolt 9 across the groove 8 at right angles therewith. Accordingly, the fastening bolt 9 is precluded from projecting beyond the outer surface of the gripping portion 2A of the bracket 2.

To provide the fastening bolt 9, the bore 5 for inserting the handlebar 1 is made eccentric with respect to the center of the spherical gripping portion 2A for a reduction in weight and from the viewpoint of design, but the eccentricity is not limitative.

The outer wire holding portion 2B is formed with a bore 13 having inserted therethrough a screw tube for adjusting the opening width of the brake lever, the bore 13 being inclined with respect to the central axis C of the handlebar inserting bore. A cutout 14 having an adjusting nut 15 fitted therein is formed in the portion 2B at right angles with the insertion bore 13. The adjusting nut 15 is screwed on the adjusting screw tube 18 which is hollow and has a bore 17 for inserting an inner wire 16 therethrough. The head 18A of the screw tube 18 has a tapered face. Except for the head 18A, the screw tube 18 has a peripheral portion cut out over its entire length to provide a planar face 18B parallel to the horizontal axis 13A of the bore 13 as seen in FIGS. 17 to 19 and is therefore in the form of a partly cut-out circle in cross section. The screw tube insertion bore 13 has the same cut-out circular cross section as the screw tube 18. Thus, the screw tube 18 inserted through the bore 13 is slidable only axially thereof without rotation.

The forward end of the insertion bore 13 is enlarged to provide a cavity 13B. A tube 21 holding one end of the outer wire 20 of the Bowden wire 19 has its one end fitted in the cavity 13B axially movably. This end of the outer wire holding tube 21 is internally threaded as at 21A and is screwed on and thereby joined to the end 18C of the screw tube 18. Accordingly, the adjusting nut 15, when rotated, moves the screw tube 18 axially thereof, and the holding tube 21 moves at the same time by the same amount as the screw tube 18.

With reference to FIGS. 15 and 16, the brake lever 3 includes a mount portion 3A and a grip portion 3B which are generally in an L-shaped arrangement. The mount portion 3A has a hole 22 for inserting the pivot 4 therethrough.

The corner of the L-shaped lever serves as an inner wire holding portion 3E and has a bore 23 extending therethrough for an inner wire adjusting screw. The lever is formed at its base end with a concave face 3C along the bracket 2 and having a slightly larger radius than the spherical surface of the bracket 2 so that the brake lever 3 will not interfere with the bracket 2 even when moved about the pivot 4.

The horizontal central axis 3D of the grip portion 3B of the brake lever 3 is positioned in the same plane as the central axis C of the handlebar inserting bore. The horizontal axis 23A of the inner wire adjusting screw inserting bore 23 is positioned in the same plane as the horizontal axis 13A of the screw tube insertion bore 13 of the bracket 2. The lever central axis 3E is parallel to the horizontal axes 13A and 23A.

The grip portion of the brake lever 3 has a thickness gradually decreasing toward its outer end and is smoothly curved by eliminating corners so as not to feel ragged when touched by hand. The head 4A of the pivot 4 is almost unprojected beyond the outer side surface of the mount portion 3A of the brake lever 3.

Indicated at 24 is a hole for inserting therethrough a tool for fastening the bolt 9.

The inner wire adjusting screw, which is tubular and indicated at 25, has an outer peripheral portion cut out in parallel to the axis to provide a planar portion 26. The adjusting screw 25 as inserted in the bore 23 is movable in the axial direction without rotating. The adjusting screw 25 is projected toward the grip portion 3B of the brake lever 3, and an inner wire adjusting nut 27 is screwed on the projected portion. The inner wire 16 is inserted in the nut 27 and has an end member 28 which is retained within the nut 27. Indicated at 29 is a wave washer.

The base end of the brake lever 3 having the inner wire adjusting screw inserting bore 23 is formed with an outwardly flaring tapered face 30, and the tapered end face of the head 18A of the screw tube 18 is in intimate contact with the tapered face 30. The adjusting nut 14, when rotated, axially moves the screw tube 18 to adjust the distance between the outer wire holding portion 2B of the bracket 2 and the brake lever 3, i.e. the opening width of the brake lever 3.

Further the inner wire adjusting nut 27, when rotated, moves the adjusting screw 25 axially thereof, whereby the length of the inner wire 16 is adjustable optimally.

The outer wire holding portion 2B and the inner wire holding portion 3E for the Bowden wire 19 are arranged on a circumference centered about the pivot 4.

The pivot hole 22 in the brake lever 3 has such a diameter as to loosely fit around the pivot 4 a coiled return spring 31 for the lever 3. The inner periphery defining the hole 22 is threaded as at 22A, and a ring 32 for adjusting the tension of the return spring is screwed in the internally threaded portion 22A of the hole. The return spring 31 has one end engaged in a cavity 33 in the bracket 2 and the other end fitted in a spring engaging recess 34 in the upper edge of the ring 32. The ring 32 has at its one end a flange 32A formed with stepped portions 35 for engaging a turning tool. The tension of the return spring 31 is variable by rotating the ring 32. Accordingly, when the brake lever 3 is released after a braking action, the lever 3 is smoothly returned to its initial position not only by the tension of the inner wire 16 but also by the elastic force of the spring 31 to move the brake shoes away from the rim.

According to the embodiment described, the adjusting nut 15, when rotated, axially moves the screw tube 18 to vary the face-to-face distance S between the outer wire holding portion 2B and the inner wire holding portion 3E, whereby the opening width W of the brake lever 3 is adjustable as desired. At this time, the screw tube 18 moves with the outer wire holding tube 21 with its head 18A in contact with the tapered face 30 of the inner wire holding portion 3E, so that the inner wire 16 and the outer wire 20 do not move relative to each other, permitting the spacing between the rim of the bicycle and the brake shoes to remain unchanged, hence no need to adjust the outer wire 20.

The head of the fastening bolt 9 for the bracket 2 is positioned within the head cavity 10 in the lower side of the bracket without projecting, while the head 4A of the pivot 4 is almost unprojected from the lever 3. The brake lever therefore has a neat appearance, feels good and is easy to grasp.

Furthermore, the Bowden wire holding portions are not projected greatly radially outwardly of the handlebar 1, permitting the cable 19 to extend along the handlebar 1. This diminishes the possible hazard.

Ideally, the axis O of rotation of the brake lever 3 should be positioned on the central axis C of the handlebar inserting bore 5, but can be positioned in the vicinity of the axis C depending on the design.

According to the present embodiment, the Bowden cable holding portions of the bracket 2 and the brake lever 3 can be positioned closer to the rotation axis O to further diminish the amount of projection thereof by suitably determining the angle between the central axis 13A, 23A of the bores 13, 23 and the distance of the brake lever 3 from the rotation axis O.

The position where the fastening bolt 9 is attached to the bracket 2 may be so selected that the brake lever 3 will not become an obstacle when the bolt is fastened.

INDUSTRIAL APPLICATION

The present invention is applicable to brake lever devices for use on the handlebars of bicycles.

I claim:

1. A brake lever device for bicycles, including a bracket mountable on a handlebar and a brake lever pivotally movably mounted on the bracket, the bracket having an outer wire holding portion for holding the outer wire of a Bowden cable, the brake lever having an inner wire holding portion for holding the inner wire of the cable, the device being characterized in that the bracket has an inserting bore through which the handlebar is removably insertable, a pivot being positioned substantially perpendicular to the central axis of the inserting bore, the brake lever being mounted on the pivot and being movable about the axis thereof, wherein the outer wire holding portion is provided with an outer wire adjusting screw tube that is axially movable by turning an adjusting nut screwed thereon for adjusting the opening width of the brake lever, the adjusting screw tube having the inner wire inserted therethrough, and the adjusting screw tube being in contact at one end with an end of the inner wire holding portion which is disposed opposite the outer wire holding portion.

2. A brake lever device for bicycles as defined in claim 1, wherein the inner wire holding portion is provided with an inner wire adjusting screw that is axially movable by turning an adjusting nut screwed thereon, the adjusting screw having the inner wire inserted therethrough and engaging the inserted end thereof.

3. A brake lever device for bicycles as defined in claim 1, wherein the other end of the adjusting screw tube is joined to an outer wire holding tube so as to be movable therewith in the axial direction.

4. A brake lever device for bicycles, including a bracket mountable on a handlebar and a brake lever pivotally movably mounted on the bracket, the bracket having an outer wire holding portion for holding the outer wire of a Bowden cable, the brake lever having an inner wire holding portion for holding the inner wire of the cable, wherein the outer wire holding portion is provided with an adjusting screw tube that is axially movable by turning an adjusting nut screwed thereon for adjusting the opening width of the brake lever, the adjusting screw tube having the inner wire inserted therethrough, the adjusting screw tube being in contact at one end with an end of the inner wire holding portion that is disposed opposite the outer wire holding portion, the inner wire holding portion being provided with an inner wire adjusting screw that is axially movable by turning an adjusting nut screwed thereon, and the adjusting screw having the inner wire inserted therethrough and engaging the inserted end thereof.

5. A brake lever device for bicycles as defined in claim 4, wherein the other end of the adjusting screw tube is joined to an outer wire holding tube so as to be movable therewith in the axial direction.

* * * * *